Dec. 1, 1959 R. LA ROSA 2,915,717

TRANSMISSION-LINE TUNING DEVICE

Filed Jan. 24, 1957

United States Patent Office 2,915,717

Patented Dec. 1, 1959

2,915,717

TRANSMISSION-LINE TUNING DEVICE

Richard La Rosa, South Hempstead, N.Y., assignor to Hazeltine Research, Inc., Chicago, Ill., a corporation of Illinois Application January 24, 1957, Serial No. 636,133

3 Claims. (Cl. 333—82)

This invention relates to transmission-line tuning devices and, though not limited thereto, particularly to such devices which are useful with transmission lines of the "line-above-ground-plane" type.

Many devices have been heretofore proposed for use with transmission lines for matching the impedance of a load to the impedance of a signal source. Such prior devices include various arrangements of tuning slugs, stubs, slots, and short auxiliary sections of line tapped onto a main transmission line. It is frequently necessary to provide for adjustment of such matching devices in order to obtain impedance matches at different operating frequencies. Also, in order to provide a fairly wide impedance matching range, it is generally necessary that such devices include several adjustable elements. As a result, such devices are, in general, rather cumbersome to adjust and such adjustment is a time-consuming process. Also, such prior devices do not readily lend themselves to either automatic or remote control.

It is an object of the invention, therefore, to provide a new and improved transmission-line tuning device which affords a greater degree of freedom in the design of the impedance characteristic of such device and which is simpler and easier to operate.

It is a further object of the invention to provide a new and improved transmission-line tuning device whereby the rotation of a single shaft serves to adjust both the position and the value of a matching impedance which is introduced across the transmission line.

In accordance with the invention, a transmission-line tuning device comprises a length of transmission line including a first length of transmission-line conductor. The device also includes a second length of conductor fixed adjacent the transmission-line conductor, this second conductor having a boundary shaped so that a surface area of this second conductor varies along the length of the conductor in accordance with a desired capacitance variation. The device further includes a movable conductor element bridging the first transmission-line conductor and the second conductor and being movable along the length of the conductors for introducing capacitance across the transmission line at any discrete position along the line in accordance with the surface area of the second conductor which is covered by the movable element.

For a better understanding of the present invention, together with other and further objects thereof, reference is had to the following description taken in connection with the accompanying drawing, and its scope will be pointed out in the appended claims.

Referring to the drawing.

Figure 1:
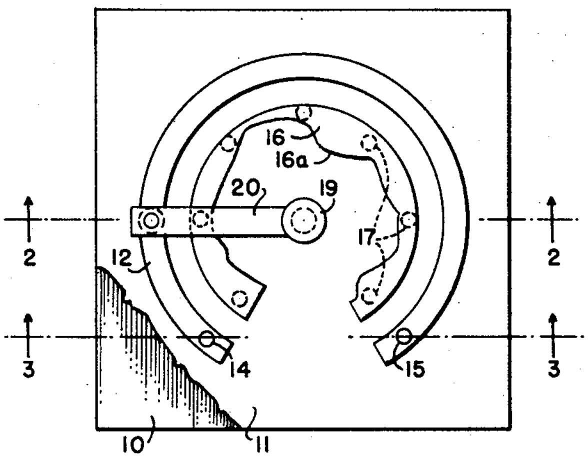
Fig. 1 is a plan view of a representative embodiment of a transmission-line tuning device constructed in accordance with the present invention.
Figure 2:
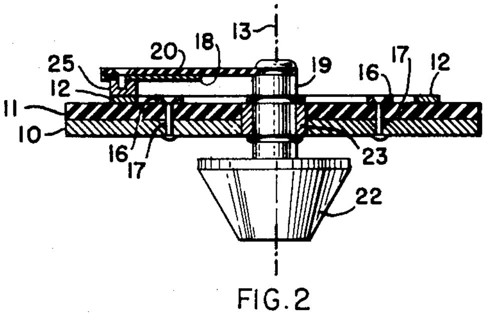
Fig. 2 is a cross-sectional view taken along the section line 2—2 of Fig. 1.
Figure 3:
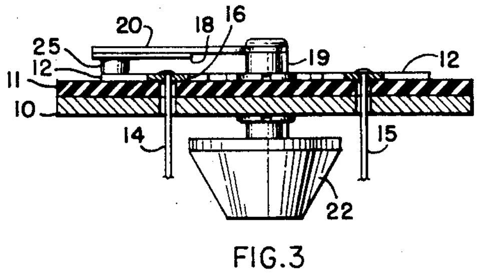
Fig. 3 is a cross-sectional view taken along the section line 3—3 of Fig. 1.

Referring to Figs. 1, 2, and 3, there are shown the details of a representative embodiment of a transmission-line tuning device constructed in accordance with the present invention. The tuning device includes a length of transmission line including a length of transmission-line conductor. Such transmission line may take the form of a line-above-ground-plane type of transmission line. In this case, such transmission line includes a ground plane 10 which may take the form of a thin metal plate. To the upper surface of the ground plane 10 is bonded a layer of dielectric or insulating material 11. On top of the dielectric layer 11 is bonded a curved length of transmission-line conductor 12 fixed adjacent but insulated from the ground plane 10 by the dielectric material 11. This transmission-line conductor 12 is preferably curved about a center axis 13. Electrical connection to the transmission-line conductor 12 may be made by way of a pair of lead wires 14 and 15 passing through holes in the ground plane 10 and dielectric material 11, as shown in Fig. 3. The ends of such lead wires are soldered to the two ends of the transmission-line conductor 12. These lead wires 14 and 15 are insulated from the ground plane 10 and their free ends may be joined to suitable connectors for coupling to any of the different well-known types of transmission line.

The tuning device also includes a second length of conductor 16 fixed adjacent the transmission-line conductor 12 and having a boundary shaped so that a surface area of this second conductor 16 varies along the length of the conductor in accordance with a desired capacitance variation. This second and separate conductor 16 is preferably connected to the ground plane 10, for example, by way of a plurality of rivets 17. In order to have a smooth upper surface for the conductor 16, these rivets 17 are preferably countersunk with the resulting holes being filled in with solder or the like. Also, it is preferable that this second conductor 16 be curved about the center axis 13 in a manner concentric with the transmission-line conductor 12. As is indicated in Fig. 1, the inner edge 16a of the second conductor 16 is shaped in a variable manner so that the area of the upper surface of the conductor 16 may vary in accordance with a desired capacitance variation. Both the transmission-line conductor 12 and the second conductor 16 may be formed on the layer of dielectric material 11 by means of any of the well-known printed circuit techniques.

The tuning device of the present invention also includes a movable conductor element 18 bridging the transmission-line conductor 12 and the second conductor 16 and being movable along the length of the conductors for introducing capacitance across the transmission line at any discrete position along the line in accordance with the surface area of the second conductor 16 which is covered by the movable element 18. The movable element 18 may be constructed as shown by utilizing a shaft 19, which is positioned coaxial with the center axis 13, and mounting the movable conductor element 18 on a pivot arm 20, one end of the pivot arm 20 being attached to the shaft 19 so that rotation of the shaft 19 controls both the position and the value of the capacitance introduced across the transmission line. The pivot arm 20 is made of dielectric or insulating material for insulating the movable conductor element 18 from the ground plane 10. Conductor element 18 may be bonded to the underside of the pivot arm 20 by using printed circuit techniques. The far end of the shaft 19 may be connected to a suitable control knob 22 and the shaft held in position relative to the ground plane 10 by means of a bushing 23.

Depending on the magnitudes of capacitance desired, the movable conductor element 18 may, as shown, be electrically connected to the transmission-line conductor 12 by way of a sliding contact member 25. The capacitance introduced by the tuning device can, where desired, be increased by using a stack of movable conductor elements and a corresponding stack of conductors corresponding to the second conductor 16 having the variably shaped boundary **16*a*. Also, a fixed trimmer condenser might be attached to the pivot arm 20 and connected between the shaft 19 and the movable conductor element 18 for affording a suitable fixed capacity in parallel with the variable capacitance between the second conductor 16 and the movable element 18**.

Considering now the operation of the device just described, it is first necessary to consider briefly the operation of a line-above-ground-plane type of transmission line, as represented by the transmission-line conductor 12 positioned above the ground plane 10. The effect of the ground plane 10 is to produce an imaginary image of the transmission-line conductor 12, which image is spaced an equal distance from the ground plane 10 on the side thereof which is opposite the side on which the transmission-line conductor 12 is located. This, in effect, creates a two-wire transmission line. In other words, the electric field configuration is the same as though the imaginary image conductor were actually present. As a result the length of transmission line including the conductor 12 may be represented schematically by a transmission line 30 in the equivalent circuit diagram of Fig. 4. The terminals 14 and 15 of this line 30 correspond to the lead wires 14 and 15 of Fig. 1.

Figure 4:
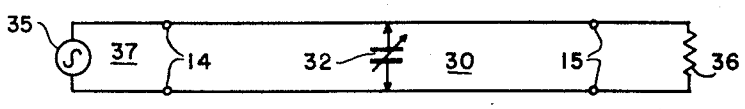
Fig. 4 is an equivalent circuit diagram showing one manner in which the tuning device of the present invention may be utilized.

The presence of the second conductor 16 and the movable conductor element 18, in effect, introduces a capacitance across the transmission line which may be represented symbolically by a condenser 32 in Fig. 4. As mentioned, the position of this condenser 32 may be varied along the transmission line by rotating the shaft 19 and thus moving the position of the movable conductor element 18 along the transmission-line conductor 12. The value of the capacitance which is introduced depends on the surface area of the second conductor 16. As a result, a different value of capacitance may be introduced at the different positions along the transmission-line conductor 12 by suitably shaping the inner boundary **16*a* of the second conductor 16. Thus, as indicated by the symbolic condenser 32 in Fig. 4, the movable conductor element 18 and the second conductor 16 form the two plates of a variable condenser 32 and both the position and capacitance value of this condenser may be adjusted by means of a single shaft 19**.

Fig. 4 illustrates the use of the tuning device of the present invention in matching the impedance of a generator 35 to a load 36. To this end, the charactristic impedance $Z_0$ of the transmission line 30 of the tuning device should be selected to nominally match the characteristic impedance of the transmission line 37 coming from the generator 35. The matching of the generator 35 to the load 36 is then accomplished by rotating the control knob 22 until a position and capacitance value of the condenser 32 are obtained at which no signal energy is reflected back towards the generator 35.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A transmission-line tuning device comprising: a length of transmission line including a first length of transmission-line conductor and a second length of conductor fixed adjacent the transmission-line conductor, the second conductor having a boundary shaped so that a surface area of this second conductor varies along the lentgh of the conductor in accordance with a desired capacitance variation; and a movable conductor element bridging the first transmission-line conductor and the second conductor and being movable along the length of the conductors for introducing capacitance across the transmission line at any discrete position along the line in accordance with the surface area of the second conductor which is covered by the movable element.

2. A transmission-line tuning device comprising: a length of line-above-ground-plane transmission line including a ground plane and a length of transmission-line conductor fixed adjacent but insulated from the ground plane; a second length of conductor fixed adjacent the transmission-line conductor and connected to the ground plane and having a boundary shaped so that a surface area of this second conductor varies along the length of the conductor in accordance with a desired capacitance variation; and a movable conductor element bridging the transmission-line conductor and the second conductor and being movable along the length of the conductors for introducing capacitance across the transmission line at any discrete position along the line in accordance with the surface area of the second conductor which is covered by the movable element.

3. A transmission-line tuning device comprising: a length of line-above-ground-plane transmission line including a ground plane and a curved length of transmission-line conductor fixed adjacent but insulated from the ground plane, this conductor being curved about a center axis; a second curved length of conductor fixed adjacent the transmission-line conductor and connected to the ground plane and having a boundary shaped so that a surface area of this second conductor varies along the length of the conductor in accordance with the desired capacitance variation this second conductor also being curved about the center axis; a shaft coaxial with the center axis; and a movable conductor element mounted on a pivot arm and bridging the transmission-line conductor and the second conductor and being movable along the length of the conductors for introducing capacitance across the transmission line at any discrete position along the line in accordance with the surface area of the second conductor which is covered by the movable element, one end of the pivot arm being attached to the shaft so that rotation of the shaft controls both the position and the value of the capacitance introduced across the transmission line.

References Cited in the file of this patent

UNITED STATES PATENTS 2,773,242 Grieg ................ Dec. 4, 1956
2,811,698 Slate ................ Oct. 29, 1957